Dec. 13, 1955    M. R. THORBURN    2,726,570
OPTICAL DIAGNOSTIC INSTRUMENTS

Filed Oct. 6, 1949    4 Sheets-Sheet 1

INVENTOR.
MILTON R. THORBURN
BY
*Louis L. Gagnon*
ATTORNEY

Dec. 13, 1955 — M. R. THORBURN — 2,726,570
OPTICAL DIAGNOSTIC INSTRUMENTS
Filed Oct. 6, 1949 — 4 Sheets-Sheet 2

INVENTOR.
MILTON R THORBURN
BY
Louis L. Gagnon
ATTORNEY

Dec. 13, 1955    M. R. THORBURN    2,726,570
OPTICAL DIAGNOSTIC INSTRUMENTS
Filed Oct. 6, 1949    4 Sheets-Sheet 3

INVENTOR.
MILTON R. THORBURN
BY
ATTORNEY

Dec. 13, 1955     M. R. THORBURN     2,726,570
OPTICAL DIAGNOSTIC INSTRUMENTS

Filed Oct. 6, 1949     4 Sheets-Sheet 4

INVENTOR.
MILTON R. THORBURN
BY
ATTORNEY

United States Patent Office 2,726,570
Patented Dec. 13, 1955

2,726,570

OPTICAL DIAGNOSTIC INSTRUMENTS

Milton R. Thorburn, Sturbridge, Mass., assignor to American Optical Company, Southbridge, Mass., a voluntary association of Massachusetts Application October 6, 1949, Serial No. 119,976

9 Claims. (Cl. 88—20)

This invention relates to improvements in diagnostic instruments of the type embodying a self-contained source of illumination and means for projecting a beam of light for examination purposes.

A principal object of the invention is to provide an instrument of the above character having an optical assembly embodying prefocussed illuminating means formed as a separate unit which may be removed from the head of the instrument without requiring detachment of the handle.

Another object is to provide an instrument of the above nature having an optical assembly and a lamp which is carried by a sleeve having aligning means thereon cooperating with aligning means in the optical assembly whereby the lamp can only be inserted in the assembly in prefocussed relation with the system and be retained in said position.

Another object is to provide an instrument of the above character having novel means for controlling and varying the electrical current flow to the illuminating means of the instrument.

Another object is to provide an instrument of the above character having novel means of a simple and efficient nature for detachably securing the head portion of the instrument to the handle.

Another object is to provide an instrument of the above character having its operative parts so constructed and arranged as to permit ease of adjustment thereof by the operator.

Another object is to provide an instrument of the above character which is comparatively simple in construction, efficient in operation, and relatively inexpensive to manufacture.

Other objects and advantages will become apparent from the following description taken in connection with the accompanying drawings, in which.

In the past, diagnostic instruments such as ophthalmoscopes embodying self-contained sources of illumination were generally inherently defective or inefficient for many reasons. In instances where illumination from lamps is directed through lenses or series of lenses, it has been found difficult to properly align the lamps with the lens systems and maintain them in aligned position. The present invention overcomes this objection by providing simple and efficient means for "prefocussing" a lamp before insertion in the optical system of the instrument by mounting the lamp in a special fixed holder which is aligned with respect to the filament of the lamp, and then inserting the lamp and holder in the instrument with the holder being insertable only when positioned so that the lamp is properly aligned with the lens system.

Another disadvantage with prior art devices of this nature is that when repairing or replacing a lamp or a lens it has sometimes been necessary to disassemble a great many of the operative parts of the device in order to do so. This disadvantage is also noted when assembling such devices in production. The present invention improves thereupon by providing an optical assembly embodying a lens system and source of illumination, which optical assembly is manufactured, assembled and prefocussed entirely independent of the major portion of the instrument, and is attached to and may be removed from the instrument head as a single independent unit through the provision of simple and efficient means permitting easy replacement or repair of parts if necessary.

Still another disadvantage of prior devices has been the means employed for removably attaching the instrument head to the handle, which means sometimes involved laborious and time-consuming procedures and failed to rigidly support the head in proper position. The present invention overcomes the above difficulties through the provision of means which may be rotated only a few degrees whereupon the head may be simply, quickly and efficiently disconnected from or rigidly and accurately secured to the handle.

The essence of the present invention, therefore, is to overcome the above objections as well as to provide other novel features as will be clearly understood by referring more particularly to the attached drawings wherein like characters of reference designate like parts throughout the several views.

Figures 4, 5, 6:
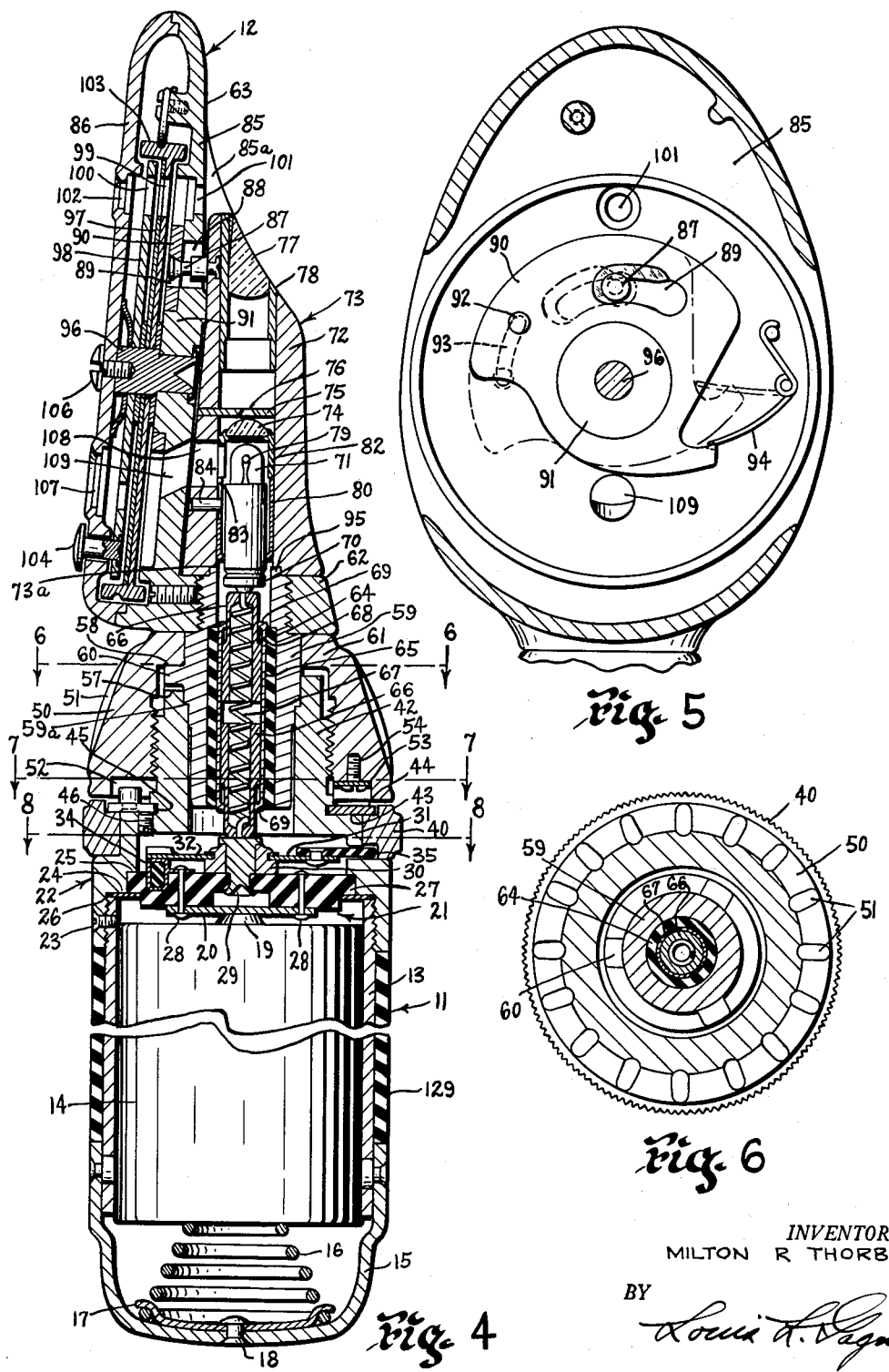
Fig. 4 is an enlarged vertical sectional view of the instrument taken on line 4—4 of Fig. 1.
Fig. 5 is a fragmentary sectional view illustrating particularly the means for removably securing the optical assembly to the head of the instrument.
Fig. 6 is a sectional view taken on line 6—6 of Fig. 4 and looking in the direction indicated by the arrows.

The instrument embodying the invention comprises broadly a handle 11 having a head 12 removably attached at one end. The handle 11, as shown best in Fig. 4, is formed with a tubular central portion 13 which serves as a container for batteries 14 which are used for the purpose of supplying electrical energy to the illuminating means carried by the head 12. The lower end of the handle 11 has a cap 15 attached to the central tubular portion 13 as by a bayonet connection and contains a coiled spring 16 which is held in place by a retainer 17 riveted or otherwise secured to the cap 15, as indicated at 18, the spring 16 acting to continuously exert pressure upon the batteries 14 to constantly urge the terminal 19 on the upper battery into engagement with a contact plate 20 of a rheostat 21.

The tubular central portion 13 of the handle has a ringlike member 22 threadedly secured to its upper end and held in place by a screw 23. The inner wall of the member 22 is formed with two inwardly extending circumferential shoulders 24 and 25 and a rheostat supporting ring 26 is located between the end of the handle portion 13 and the shoulder 24. The rheostat 21 is adapted to rest upon the ring 26 and is clamped thereagainst by the shoulder 25.

Figure 8:
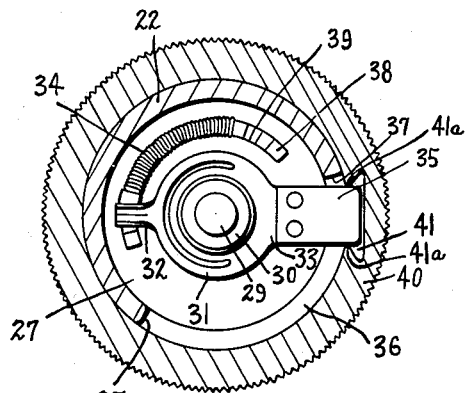
Fig. 8 is a sectional view taken on line 8—8 of Fig. 4 and looking in the direction indicated by the arrows.

The body portion 27 of the rheostat is formed of non-conductive material to which the contact plate 20 is secured by headed pins 28 or other suitable means. Secured to the body portion 27 and spaced from the contact plate 20 is a central stud member 29 which has a hub 30 rotatably mounted therearound. The hub 30 carries a fixed ringlike member 31 (Figs. 4 and 8) having a pair of opposed outwardly extending arms 32 and 33 formed thereon. The arm 32 acts as a conductive contact carrying member and is adapted to be rotatably moved about the axis of the pivot 29 and to constantly engage a resistance coil 34 which has one end conductively connected to one of the pins 28 which conductively engages the contact plate 20.

The arm 33 has one end of a non-conductive operating member 35 pinned or otherwise fixedly secured thereto, the other end of the member 35 being extended through a slot 36 in the ring-like member 22, the slot 36 being of a length to extend along about one-third of the circumference of the member 22 and providing means for permitting the member 35 to be moved about the pivot 29 within the confines of the slot 36 in positioning the contact arm 32 as desired with relation to the resistance coil 34, the ends 37 of the slots 36 forming abutment means for limiting the movement of the member 35. Thus the contact arm 32 is maintained in constant engagement with the resistance coil 34 or in the "off" position on the coil supporting member 38 as indicated by numeral 39.

A knurled operating ring 40 is rotatably mounted over the ringlike member 22 and is provided with a notch 41 on its inner surface adjacent the slot 36 and shaped to receive the free end of the operating member 35. Thus, upon rotation of the ring 40 the arm 33 of the rheostat will be rotated about the pivot 29 to position the contact 32 on the resistance coil 34 as desired. This will control the flow of electrical energy from the batteries 14 through the rheostat 21 and permit varying the intensity of the source of illumination.

The notch 41 into which the end of the operating member 35 extends bears upon the opposed sides of the member 35 and is shaped to engage the member in small confined areas as indicated by numeral 41a. The entrance opening into the notch 41 is merely wide enough to receive the member 35 and the notch progressively widens as it deepens so that bearing upon the member 35 takes place at only the entrance opening (41a). This provides means for confining pressure, during operation of the device, to a small area as near as possible to the ringlike member 22. With this construction, when the member 35 is in engagement with an end of the slot 36, any excessive pressure upon the member 35, due to possible continued attempts to rotate the operating ring 40, will not cause the member 35 to tend to pivot about its point of engagement with the end of the slot 36, with possible consequent damage to the connection with the central stud 29, as might occur when the notch 41 engages the member 35 in larger areas.

Figure 13:
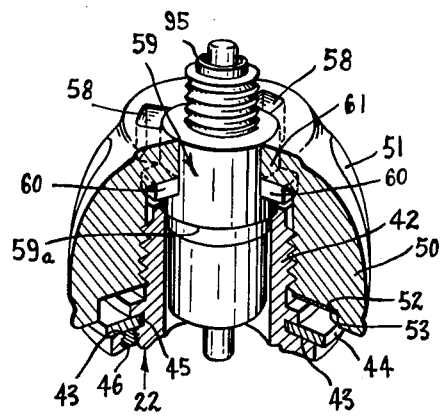
Fig. 13 is a fragmentary sectional view of the head connecting mechanism.

The upper end of the ringlike member 22 is shaped to have a reduced threaded portion 42 of smaller diameter than the lower end thereof, forming an annular shelf 43 therearound, on which is adapted to reside a stop ring 44 (Figs. 4 and 13). The stop ring 44 is freely rotatable about the reduced portion 42 and is adapted to reside within a circumferential groove 45 provided therefor in the portion 42. Means such as a set screw 46 is inserted through the shelf portion of the member 22 for engaging the lower surface of the stop ring 44 and locking it against the upper surface of the groove 45 to prevent rotary movement of the stop ring 44 after it has been set in desired axial position.

Figure 7:
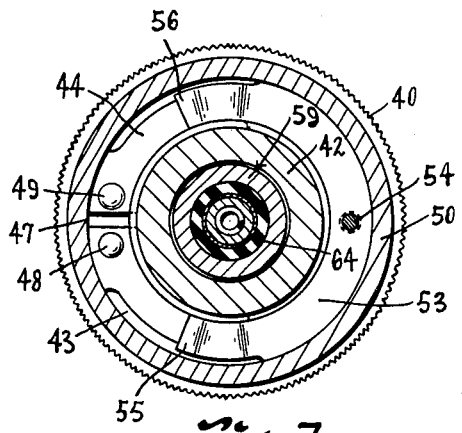
Fig. 7 is a sectional view taken on line 7—7 of Fig. 4 and looking in the direction indicated by the arrows.

The stop ring 44 is split at 47 (Fig. 7) and carries a pair of upwardly extending stop pins 48 and 49 thereon, one adjacent each side of the split 47.

The upper end of the reduced portion 42 has a head connecting member 50 threadedly connected thereto, the member 50 being preferably externally grooved, knurled, or roughened as at 51 to provide efficient gripping means. The lower peripheral edge of the member 50 is adapted to overlie the stop ring 44 and operating ring 40 and is grooved at 52 to receive a substantially U-shaped spring member 53 (Fig. 7) which is fixedly connected thereto as by a screw 54. The end portions 55 and 56 of the spring member 53 are bent so as to be spaced away from the base of the groove 52 and to engage the respective stop pins 48 and 49 when the connecting member 50 is screwed down onto the reduced portion 42.

In assembling the device, the stop ring 44 is initially adjusted and locked by screw 46 and the connecting member 50 threaded downwardly onto the reduced portion 42 until the stop pins are so positioned between the end portions 55 and 56 of the spring member 53 that movement of the member 50 will cause one or the other of the end portions 55 or 56 to abut against one of the stop pins 48 or 49, limiting the movement of the member 50. In order to remove the connecting member 50 it is necessary to loosen the set screw 46 to permit the stop ring 44 to rotate with the member 50 until the member 50 is unscrewed sufficiently to permit the end portions 55—56 to be spaced from the stop pins 48—49.

The reduced portion 42 of the ringlike member 22 and the connecting member 50 are provided with concentric longitudinal bores in which the lower depending part 59 of the head 12 is adapted to be positioned. The extreme upper end of the ringlike member 22 is provided with one or more notches 57, preferably three in number, and the upper end of the connecting member 50 is provided with a similar number of corresponding notches 58. The notches 58 are adapted to be aligned with the notches 57 when the connecting member 50 is unscrewed from the reduced portion 42 an amount sufficient to cause the end portion 56 of the spring member 53 to engage the stop pin 49.

When the parts are in this position the depending supporting portion 59 of the head 12 can be inserted into the bores in the members 50 and 22. The portion 59 is provided with a plurality of radially extending tongues 60, one for each notch 58, which will be simultaneously inserted through the notches 58 into the notches 57. When in this position the tongues 60 rest in the notches 57 on the upper end of the portion 42. By rotating and tightening the connecting member 50 on the portion 22, the notches 58 will be displaced from aligned position with the notches 57 and solid portions 61 of the upper end of the member 50 will be positioned in overlying relationship over the tongues 60 to retain them in position in the notches 57.

The depending supporting portion 59 is provided with a shouldered portion 59a (Fig. 13) which is adapted to reside upon a circumferential shelf provided therefor on the inner wall of the reduced portion 42 of the ringlike member 22. The portion 59 will thus be supported by the shelf rather than by the tongues 60, the tongues 60 being spaced slightly above the base of the notches 57. The solid portions of the member 50, however, will closely engage the upper surfaces of the tongues 60 to retain the parts in intimate assembled relationship. The head will also be prevented from turning on the handle by the interlocking relationship between projections 60 and notches 57.

With this construction, in order to remove the head 12 from the handle 11 it is merely necessary to rotate the connecting member 50 in a counter-clockwise direction only the fraction of a turn necessary to cause the spring end portion 56 to engage stop pin 49 whereupon further rotation is prevented and notches 58 are again automatically aligned with notches 57. The head 12 can then be removed.

The depending supporting portion 59 of the head 12 has its upper threaded end fixedly mounted in the base portion 62 of a housing 63 and in assembling the head 12 with the handle 11 the spacing between the tongues 60 and the bottom surface of the base 62 is such that there will be a slight clearance between them for the top of the connecting member 50.

Figure 11:
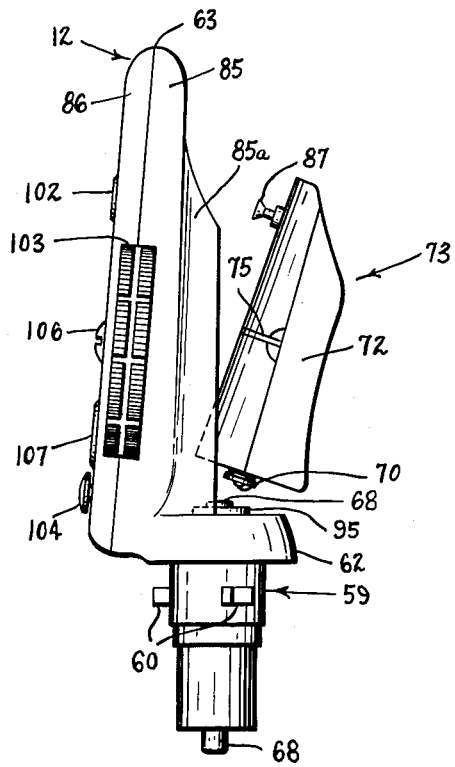
Fig. 11 is a side elevational view of the instrument head showing the optical assembly unit in detached relation with the head.

The portion 59 is formed with an internal longitudinal bore in which is a sleeve 64 of suitable non-conductive material. Within the sleeve is a tubular bushing 65. In each end of the bushing is provided a slidable contact member 66, the members 66 being spaced apart and continually urged in opposite directions by a coiled tension spring 67 having its opposed ends conductively connected or soldered to the members 66. To prevent displacement of the parts each member 66 is provided with a shouldered portion 68 adapted to engage a retaining flange 69 formed on the adjacent end of the bushing 65. Thus there is formed a pair of plunger-like contacts 66, the lower of which is adapted to yieldingly engage the rheostat stud 29 and the upper is adapted to yieldably engage the terminal 70 on the end of an illuminating bulb or lamp 71 (Figs. 4 and 11).

The lamp 71 is carried in an elongated hollow case 72 as part of a separable optical assembly unit 73 removably attached to the housing 63. The lamp 71 is removably mounted in the lower end of the case 72 beneath a lens or lens system 74 supported in the case 72. An apertured member 75 is carried above the lens 74, the size of the aperture 76 therein being controlled to permit projection of illumination passing through the lens 74 from the lamp 71 onto a prism or other light deflecting means 77 from which it is reflected as desired to the object being examined.

The prism or the like 77 is suitably supported in the case 72 by means such as a tubular holder 78. The apertured member 75 is adapted to reside in a slot or kerf formed in the case 72 and can be easily removed and replaced by another member 75 having a different sized aperture 76 if desired.

In the manufacture of instruments of this type it is important to control the axial position of the lamp 71 and the spacing between the lamp 71 and the lens or lens system 74. This is for the purpose of focussing an image of the filament 79 of the lamp 71 on the reflecting surface of the prism 77 for greatest efficiency.

Figure 12:
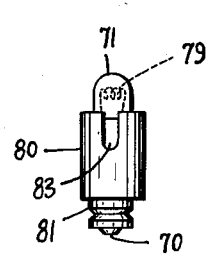
Fig. 12 is an enlarged front view of a lamp assembly.

Therefore, to accomplish these results the lamp 71 is prefocussed prior to the attachment of the unit 73 to the head housing 63. The lamp is carried by a tubular sleeve 80 (Fig. 12) which is of a size to permit sliding engagement with the interior of the case 72. The sleeve 80 is mounted over the lamp 71 and fixedly secured as by solder or the like to the lamp socket 81. It is important to note that in assembling the lamp 71 with the sleeve 80, the end of the sleeve is spaced at a definite predetermined distance from the filament 79 of the lamp. With this construction the lamp 71 and sleeve 80 can be inserted in the case 72 and slid inwardly until the end of the sleeve engages stop means therefor. The stop means in the present construction, is formed as a ring or collar 82 immovably mounted within the case 72 and serves as means for locating the lens 74. The length of the collar 82 is definitely controlled so that when the end of the sleeve 80 is in engagement therewith the filament 79 will be automatically spaced as desired from the lens 74.

The sleeve is also provided with a slot 83 which is axially aligned with respect to the lamp filament 79 at the time the sleeve is assembled with the lamp. Thus, when the sleeve 80 is positioned in the case 72 the slot 83 will be engaged by a pin 84 fixedly carried by the case 72. In this manner the assembled lamp and sleeve can be positioned in the case with the filament 79 being automatically spaced from the lens 74 and axially aligned therewith in the desired manner to provide greatest efficiency.

It is to be understood that filters may be inserted in the optical assembly unit adjacent the apertured member 75, if desired, such as color filters and variable density filters.

Figure 3:
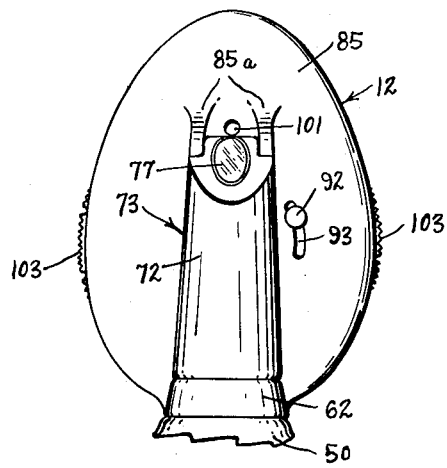
Fig. 3 is a rear elevation of the head portion of the instrument with the handle portion broken away.

The head housing 63 is formed with a front cover 85 and a back cover 86. The optical assembly unit is removably attached (Fig. 11) to the front cover 85 and positioned between a pair of vertical guides 85a formed on the cover 85. The side of the case 72 directed toward the cover 85 carries a headed pin 87 which is adapted to project through an opening 88 (Figs. 4 and 5) in the cover 85 and to be held in position in a slot 89 in a cam 90 residing upon the inner surface of the cover 85 and rotatable about an inner embossed portion 91 of the cover 85. To rotate the cam 90 so as to position the widest end portion of the slot 89 adjacent the opening 88 and permit entry of the headed end of the pin 87, the cam 90 is provided with a pin 92 extending through a slotted opening 93 in the cover 85 (Figs. 3 and 5). By manually pulling downwardly on the exposed end of the pin 92 the cam 90 will be rotated against the tension of a spring 94 carried on the inner surface of the cover 85 and permit the slot 89 and opening 88 to be aligned, permitting the pin 87 to be inserted as shown by dot-dash lines in Fig. 5. Then upon release of the pin 92 the spring 94 will return the case to its initial position whereupon the edges of the narrow portion of the slot 89 will be positioned beneath the head of the pin 87 and will thus retain the unit 73 in place on the head.

A recess 73a is provided in the lower end of the case 72 for engagement by a projecting portion 95 of the supporting portion 59 for preliminarily locating the lower end of the unit 73 in desired position as shown in Figs. 4 and 11.

A pivot pin 96 is carried by the embossed portion 91 of the cover 85 and extends in a direction rearwardly toward the cover 86. Rotatably mounted on the pivot pin 96 are a main dial 97 and an auxiliary dial 98 which are spaced apart from each other and from the adjacent parts of the device by suitable washers. The dials 97 and 98 each carry a plurality of lenses 99 and 100 respectively in the conventional manner, the lenses all having different focal values. The covers 85 and 86 are provided with sight openings 101 and 102 axially aligned in substantially adjacent parallel or convergent relation with the axis of the light beam as it passes from the prism to the object being examined. The lenses 99 and 100 carried by the lens dials 97 and 98 are adapted to be selectively placed in axial alignment with the sight openings 101 and 102 by revolving the dials. The main dial 97 is provided with a knurled rim 103 which has portions extending through longitudinal openings provided therefor in the sides of the head 12 where they are readily available to the fingers of the operator during use of the instrument. The auxiliary dial 98 has a pin 104 secured thereto, the pin 104 extending through a curved slot 105 in the rear cover 86. By engaging the pin 104 and moving it within the limits permitted by the slot 105 the auxiliary dial 98 can be rotated independently of the main dial 97.

The rear cover 86 is secured in place by means such as a screw 106 extending into the pivot pin 96. A peep hole 107 is also provided through the lower portion of the rear cover 86 and illumination from the lamp 71 indirectly passes thereto by means of an opening 108 adjacent the lamp 71 in the case 72 of the optical assembly unit 73, which opening 108 is in communication with an inclined or angled opening 109 in the front cover 85.

Figure 1:
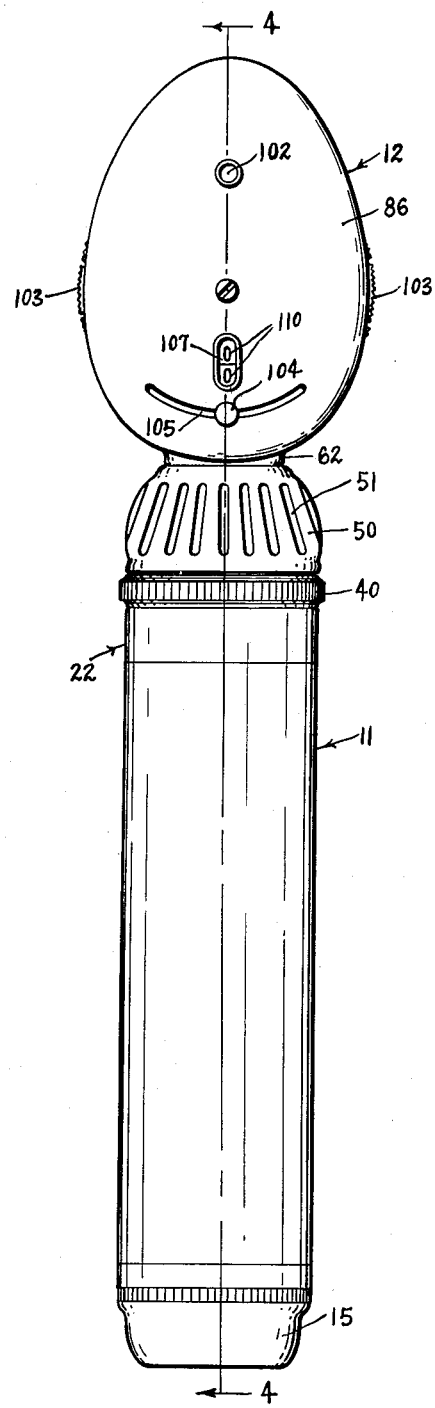
Fig. 1 is a front elevation of an instrument embodying the invention.
Figure 2:
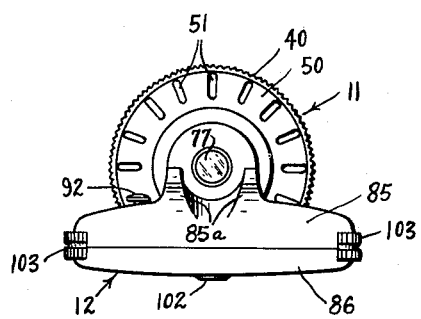
Fig. 2 is a top plan view of the instrument shown in Fig. 1.

The dials 97 and 98 are provided with indicia 110 (Fig. 1) which are formed thereon so as to be translucent, and when illuminated by the light passing through the openings 108 and 109 the indicia 110 on the dials 97 and 98 corresponding to the lenses 99 and 100 which are at the time aligned with the sight openings 101 and 102 will be readily visible through the peep hole 107.

Figure 9:
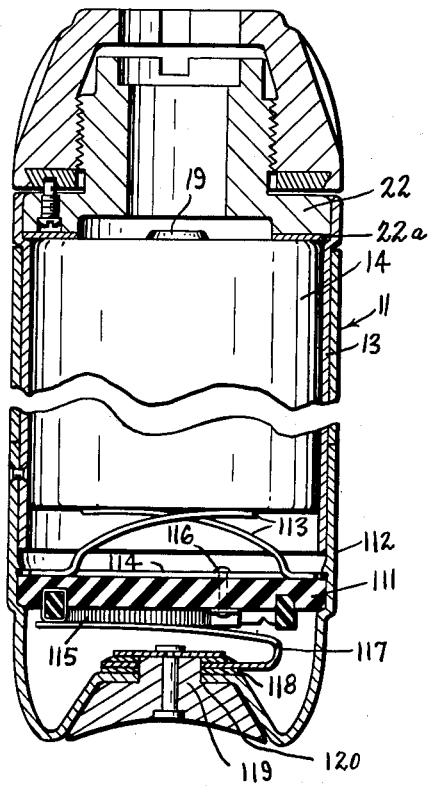
Fig. 9 is a fragmentary vertical sectional view illustrating a modification of the instrument handle.

Although the foregoing description refers to a handle 11 having rheostat control means adjacent the end of the handle having the head 11 connected thereto, it is conceivable that the rheostat could be located in the opposite end of the handle 11 as shown in Fig. 9. In this construction a non-conductive rheostat base plate 111 is suitably mounted in the handle end portion 112 and leaf springs 113 formed on a metal disc 114 are used to urge the batteries 14 upwardly into position where the upper battery 14 will be forced against a washer 22a positioned beneath the ringlike member 22 whereupon the terminal 19 on the upper battery 14 will engage the contact member 66. The rheostat 115 will in this case be conductively connected to the disc 114 by a pin 116 and will be engaged by a contact arm 117 carried by a hub 118 which is in turn attached to a knob 119 rotatably located in a depression 120 in the end of the handle portion 112. Thus, the effective flow of energy from the batteries will pass therefrom to the metallic material of the handle 11 through and under control of the rheostat 115.

Figure 10:
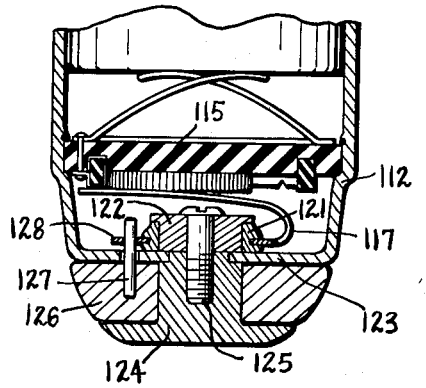
Fig. 10 is a fragmentary sectional view of the lower end of a handle illustrating another modification in the rheostat control means.

The rheostat control means can be further modified as shown in Fig. 10 wherein the contact arm 117 is attached to a ring 121 which rotatably encircles a flanged inner retainer 122 located on the inner end wall 123 of the handle portion 112. An outer retainer 124 is attached through an opening in the wall 123 to the retainer 122 by means such as screw 125. The retainer 122 has a suitable collar or grip 126 rotatably mounted thereover which can be easily manipulated by the operator. A pin 127 located in the grip 126 and extending through a concentric slot in the end wall 123 is connected to a ring member 128 carried by the ring 121 and by rotating the grip 126 around the retainer 124 the ring 121 and consequently the contact arm 117 can be rotated to control the flow of energy through the rheostat in the usual manner.

The handle is preferably provided with an outer covering 129 of insulation material.

From the foregoing it will be seen that there is provided an improved instrument embodying all of the objects and advantages of the invention.

Although the novel features of the invention, which are of an efficient and economical nature, have been described and are pointed out in the annexed claims, it will be understood that many changes may be made in the construction and methods described without departing from the spirit of the invention. I, therefore, do not wish to be limited to the exact details described as the preferred construction is set forth by way of illustration only.

Having described my invention, I claim:

1. A diagnostic instrument of the character described comprising an instrument head, a support therefor and means for detachably connecting said head to the support, said means including a central bore provided in the upper portion of said support and having a plurality of radially spaced slots communicating with said bore and of predetermined size, a locking member rotatable about said slotted portion, said locking member having a portion thereof overlying the end of said slotted upper portion and provided with a central opening of a size approximately equal to and aligned with said central bore, said overlying portion having a plurality of recesses spaced similar to and of a size at least that of the notches in said upper portion, said recesses communicating with the central opening, a connecting portion depending from the instrument head and being of a size and length to fit within said aligned central opening and bore, said connecting portion having a plurality of radially extending fins protruding therefrom of a size and so spaced as to permit their passing through the recesses in said locking member and to relatively intimately fit into the slots in said upper portion of the support when the recesses and slots are in aligned relation, together with means on the adjacent walls of said slotted portion and rotatable locking member restricting the rotation of the locking member to a turn of limited amount, the recesses at one end of said turn of the locking member being aligned with the slots to permit passing of said fins therethrough to the slots, and at the other end of the turn said recesses being offset from the slots to prevent withdrawal of the fins whereby the head may be detachably connected with its support.

2. A diagnostic instrument of the character described comprising an instrument head, a support therefor and means for detachably connecting said head to the support, said means including a first member fixed to said support and having a central bore provided in the upper portion thereof and a plurality of radially spaced slots communicating with said bore and of predetermined size, a locking member rotatable about said fixed member, said locking member having a portion thereof overlying the upper end of said fixed member and provided with a central opening of a size approximately equal to and aligned with said central bore thereof, said overlying portion having a plurality of recesses spaced similar to and of a size at least that of the notches in said upper portion and communicating with the central opening, a connecting portion depending from the instrument head and being of a size to fit within said aligned central opening and bore, said connecting portion having a plurality of radially extending fins protruding therefrom of a size and so spaced as to permit their passing through the recesses in said locking member into the slots in said fixed member when the recesses and slots are in aligned relation, together with stop means on one of said members and U-shaped spring fixed to the other member and extending about the fixed member with its ends so spaced as to engage said stop means during rotation of the locking member to restrict rotation of the locking member to a turn of limited amount, the recesses at one end of said turn of the locking member being aligned with the slots to permit passing of said fins therethrough to the slots, and at the other end of the turn said recesses being offset from the slots to prevent withdrawal of the fins, and the size of said fins and slots being so related that the fins snugly reside therein whereby the head may be detachably but firmly connected with its support.

3. A diagnostic instrument of the character described comprising an instrument head, a support therefor and means for detachably connecting said head to the support, said means including a central bore provided in the upper portion of said handle and having a plurality of radially spaced slots communicating with said bore and of predetermined size, a locking member rotatable about said slotted portion and in threaded connection therewith, said locking member having a portion thereof overlying the end of said slotted upper portion, said overlying portion being provided with a central opening of a size approximately equal to and aligned with said central bore, and further having a plurality of recesses spaced similar to and of a size at least that of the notches in said upper portion and communicating with the central opening, a connecting portion depending from said instrument head of a size to fit within said aligned central opening and bore, said connecting portion having a plurality of radially extending fins protruding therefrom of a size and so spaced as to permit their passing through the recesses in said locking member into the slots in said upper portion of the support when the recesses and slots are in aligned relation, together with means on the locking member and slotted upper portion of the handle to engage with each other during rotation of the locking member to restrict the rotation of the locking member to a turn of limited amount, the recesses at one end of said turn of the locking member being aligned with the slots to permit passing of said fins therethrough to the slots, and at the other end of the turn said recesses being offset from the slots to prevent withdrawal of the fins, said fins having a width approximately equal to that of the slots so as to snugly fit therein but having a depth slightly less than the length of the slots, said connecting portion of the instrument head having a shouldered portion about its periphery and the upper slotted portion having a circumferential shelf in the central bore thereof on which said shouldered portion is adapted to reside to hold the weight of the instrument head, and said turn of the locking member being sufficient to permit the overlying portion of the locking member on rotation to said offset relation to engage the adjacent surface of said fins.

4. In a diagnostic instrument of the character described, a support and a head carried by said support, said head comprising a pair of separate members arranged in juxtaposed and readily detachable but assembled relation, one of said members embodying diagnostic means having a base portion for connection with the support and an upright portion united therewith carrying sight means, the other member embodying a casing containing as a unit illuminating means and an optical system located in predetermined spaced relation and axial alignment with the illuminating means to direct a beam of light from the illuminating means along a path intersecting the line of sight of one viewing an object through said sight means of the first member when the device is in use, said first and second members having longitudinally disposed juxtaposed interfitting guide portions on adjacent side surfaces thereof for locating said members in predetermined aligned relation with each other, one of said members having a releasable latch portion and the other a connection member for connection with said latch portion for releasably locking said juxtaposed interfitting guide portions together to hold said first and second members in said predetermined aligned relation.

5. In a diagnostic instrument of the character described, a support and a head carried by said support, said head comprising a pair of separate members arranged in juxtaposed and readily detachable but assembled relation, one of said members embodying diagnostic means having a base portion for connection with the support and, axially offset therefrom, a housing having a sight aperture adjacent its upper end and containing a plurality of lens elements alignable with said sight aperture, the other member embodying an elongated casing adapted to rest against said housing of the first member with its end on the base portion thereof and containing as a unit illuminating means and an optical system located in predetermined spaced relation and axial alignment with the illuminating means to direct a beam of light from the illuminating means along a path intersecting the line of sight of one viewing an object through said sight aperture in the housing of the first member when the device is in use, and said housing of the first member having a pair of flange-like portions partially surrounding said casing embodying the second member for maintaining it in a predetermined aligned relation with respect to said sight aperture.

6. In a diagnostic instrument of the character described, a support and a head carried by said support, said head comprising a pair of separate members arranged in juxtaposed and readily detachable but assembled relation, one of said members embodying diagnostic means having a base portion for connection with the support and, axially offset therefrom, an upwardly extending housing having a sight aperture adjacent its upper end and containing a plurality of lens elements alignable with said aperture, and said other member embodying a casing adapted to rest against said housing of the first member and containing as a unit illuminating means and an optical system located in predetermined spaced relation and axial alignment with the illuminating means to direct a beam of light from the illuminating means along a path intersecting the line of sight of one viewing an object through said sight means of the first member when the device is in use, said base portion of the first member having an opening communicating with the interior of the support the lower end of the casing of said second member having a portion fitting through said opening to establish electrical contact for its illuminating means with electrical source means located interiorly of the support, control means mounted on the instrument for operating said illuminating means, and alignment means for maintaining said second member in predetermined aligned relation with respect to the sight aperture in the housing of the first member, and interconnection means carried by said two members for detachably holding them in said predetermined aligned relation.

7. In a diagnostic instrument of the character described, a support and a head carried by said support, said head comprising a pair of separate members arranged in juxtaposed and readily detachable but assembled relation, one of said members embodying diagnostic means having a base portion for connection with the support and, axially offset therefrom, a housing having a sight aperture adjacent its upper end and containing a plurality of lens elements alignable with said sight aperture, the other member embodying a casing adapted to rest against said housing of the first member with its end on the base portion thereof and containing as a unit illuminating means and an optical system located in predetermined spaced relation and axial alignment with the illuminating means to direct a beam of light from the illuminating means along a path intersecting the line of sight of one viewing an object through said sight aperture in the housing of the first member when the device is in use, said base portion of the first member having a restricted opening communicating with the interior of the support and the casing of the second member having a portion fitting in said opening to establish electrical contact for its illuminating means with source means located interiorly of the support, said housing of the first member having a further opening and the casing of the second member having a protruding portion to fit within said opening, and adjustable latch means for grasping said protruding portion and detachably holding said second member in a predetermined aligned relation with respect to the sight aperture in said housing of the first member.

8. In a diagnostic instrument such as described, a support having a head connected thereto, illuminating means mounted on said head, and control means for operating said illuminating means including a supporting member fixed within said support and having a resistance coil mounted thereon, a contact carrying member rotatably mounted on said supporting member and having a contact portion for engagement with said coil, said resistance coil and contact portion comprising a part of the electrical circuit of said illuminating means, said contact carrying member having an actuating arm for rotating said contact carrying member to move the contact portion along the length of the resistance coil, said actuating arm extending through a slot in said support, and an operating ring rotatably mounted over said support and having a notch on its inner side for receiving the end of said actuating arm extending through the slot, said notch having an entrance of a size only sufficient to receive the end of said actuating arm, the notch progressively widening in a direction away from said entrance so that bearing pressure on said actuating arm is confined to a small area adjacent the inner side of the ring which is as near as possible to the center of rotation and which is radially spaced from the outer side of the ring where rotational pressure on the operating ring is applied.

9. In a diagnostic instrument of the character described comprising a support, a head detachably connected to said support having a sight opening through which an object may be viewed, said head having a hollow bore therein with its longitudinal axis substantially normally related with and intersecting the axis of the sight opening, said bore containing light-deflecting means in the upper end thereof in adjacent relation with the sight opening, a lens in said bore at a controlled distance from the light-deflecting means, a member mounted within the bore having a lower abutment edge a controlled distance from the lens, and a removable prefocused lamp unit supported in said bore and means for automatically positioning and retaining the filament of the lamp in axially aligned relation with the axis of the lens and at a given controlled distance therefrom, said means comprising a lamp having a base, a tubular sleeve of a diameter such as to intimately fit within the bore, said sleeve being secured to said lamp base with the filament preaxially aligned with the axis of the sleeve and spaced a controlled distance from the upper edge of the sleeve, a slot in said upper edge in controlled transverse relation with the filament, said upper edge of the sleeve, when the prefocused lamp unit is positioned in the bore, being adapted to abut with the lower edge of the member in the bore and a protrusion at a controlled location in said bore adapted to interfit with the slot in the sleeve whereby such prefocused lamp units may be readily interchanged with the assurance that each of the filaments of said units will be auotmatically properly axially located with respect to the lens and be supported at a fixed controlled distance therefrom for consistent maximum illumination efficiency.

References Cited in the file of this patent

UNITED STATES PATENTS

| Number | Name | Date |
|---|---|---|
| 13,112 | Waterhouse | June 19, 1855 |
| 1,018,356 | Hastings | Feb. 20, 1912 |
| 1,069,146 | Kennedy | Aug. 5, 1913 |
| 1,145,586 | Herold | July 6, 1915 |
| 1,516,133 | Allyn | Nov. 18, 1924 |
| 1,655,700 | Hummel | Jan. 10, 1928 |
| 1,767,266 | Wappler et al. | June 24, 1930 |
| 1,977,813 | Tillyer | Oct. 23, 1934 |
| 1,981,214 | Allyn | Nov. 20, 1934 |
| 2,014,888 | Forshey | Sept. 17, 1935 |
| 2,080,844 | Wittig | May 18, 1937 |
| 2,098,702 | Gagnon | Nov. 9, 1937 |
| 2,111,187 | Keeler | Mar. 15, 1938 |
| 2,400,351 | Hart | May 14, 1946 |
| 2,416,558 | Wilkinston | Feb. 15, 1947 |

FOREIGN PATENTS

| Number | Country | Date |
|---|---|---|
| 19,503 | Great Britain | Aug. 15, 1912 |